(12) United States Patent
Dimov et al.

(10) Patent No.: US 10,452,025 B2
(45) Date of Patent: Oct. 22, 2019

(54) SUBSTRATE-GUIDED WAVE-BASED TRANSPARENT HOLOGRAPHIC CENTER HIGH MOUNTED STOP LIGHT AND METHOD OF FABRICATION THEREOF

(71) Applicant: Luminit LLC, Torrance, CA (US)

(72) Inventors: Fedor Dimov, Redondo Beach, CA (US); Engin Arik, Thousand Oaks, CA (US); Jun Ai, Lakewood, CA (US); Xiaowei Xia, San Pedro, CA (US); Neven Rakuljlc, Santa Ana, CA (US); Chris Griffo, Torrance, CA (US); Jay Perlin, San Jose, CA (US); Leo Katsenelenson, Los Angeles, CA (US); Stanley Tafeng Kao, Torrance, CA (US); Chinmaya Dharmadhikari, Torrance, CA (US)

(73) Assignee: LUMINIT LLC, Torrance, CA (US)

( * ) Notice: Subject to any disclaimer, the term of this patent is extended or adjusted under 35 U.S.C. 154(b) by 249 days.

(21) Appl. No.: 14/269,757

(22) Filed: May 5, 2014

(65) Prior Publication Data

US 2015/0124303 A1    May 7, 2015

Related U.S. Application Data

(60) Provisional application No. 61/899,633, filed on Nov. 4, 2013.

(51) Int. Cl.
*G03H 1/00* (2006.01)
*G03H 1/26* (2006.01)
*G03H 1/04* (2006.01)
*B60Q 1/30* (2006.01)
*G03H 1/22* (2006.01)

(52) U.S. Cl.
CPC ........... *G03H 1/0005* (2013.01); *B60Q 1/302* (2013.01); *G03H 1/0408* (2013.01); *G03H 1/26* (2013.01); *G03H 2001/0413* (2013.01); *G03H 2001/2226* (2013.01); *G03H 2001/261* (2013.01); *G03H 2001/2615* (2013.01); *G03H 2223/16* (2013.01)

(58) Field of Classification Search
CPC . G02B 5/32; G02B 5/203; G02B 5/18; G02B 6/00; G02B 6/0016; G02B 6/0028; G02B 6/0046; G02B 6/005; G02B 6/0053; G02B 6/0058; G02B 6/0061
USPC ......... 359/1–35, 599, 485.01, 622, 630, 633
See application file for complete search history.

(56) References Cited

U.S. PATENT DOCUMENTS

2004/0080938 A1* 4/2004 Holman .................... F21S 8/08
362/231
2007/0253058 A1* 11/2007 Wood ...................... G03B 21/60
359/455

(Continued)

*Primary Examiner* — Robert E. Tallman
(74) *Attorney, Agent, or Firm* — Lathrop Gage L.L.P.

(57) ABSTRACT

Multiple pairs of substrate-guided wave-based holograms (SGWHs) are laminated to a common thin substrate to form a transparent substrate-guided wave-based holographic CHMSL (SGWHC) that diffracts playback LED illumination over a wide angular range. This device is made pursuant to a technique that includes the steps of recording a first set of SGWHs with one setup, that upon playback, will couple and guide the diffracted light inside the substrate, and a second set of SGWHs recorded with another setup, that will diffract and couple the guided light out.

7 Claims, 5 Drawing Sheets

(56) References Cited

U.S. PATENT DOCUMENTS

| | | | |
|---|---|---|---|
| 2007/0284768 A1* | 12/2007 | Takahashi | G02B 5/32 264/1.34 |
| 2008/0232133 A1* | 9/2008 | Segawa | G02B 6/002 362/610 |
| 2010/0085732 A1* | 4/2010 | Kamada | G02F 1/133606 362/97.1 |
| 2010/0157400 A1* | 6/2010 | Dimov | G02B 5/188 359/13 |
| 2012/0085933 A1* | 4/2012 | Doi | G01N 21/645 250/459.1 |
| 2012/0188791 A1* | 7/2012 | Voloschenko | G02B 5/0252 362/606 |
| 2012/0206781 A1* | 8/2012 | Kihara | G03H 1/265 359/12 |
| 2012/0294037 A1* | 11/2012 | Holman | F21V 5/02 362/609 |
| 2013/0120814 A1* | 5/2013 | Arai | G03H 1/0011 359/11 |

\* cited by examiner

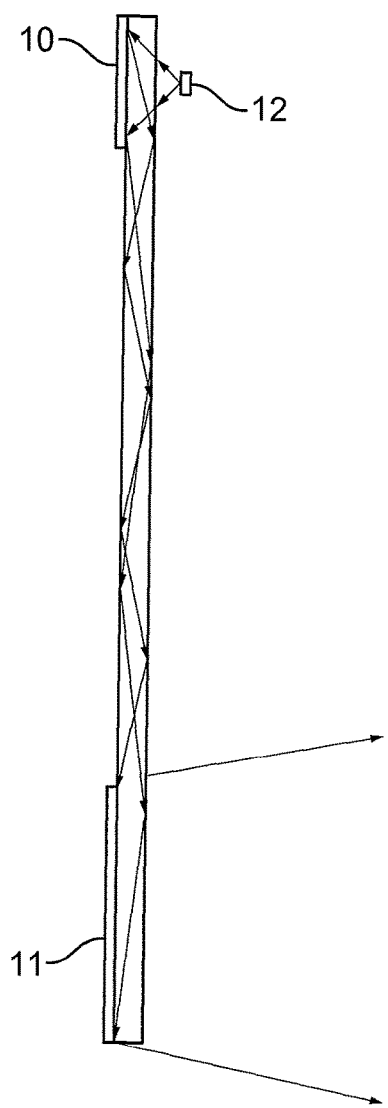
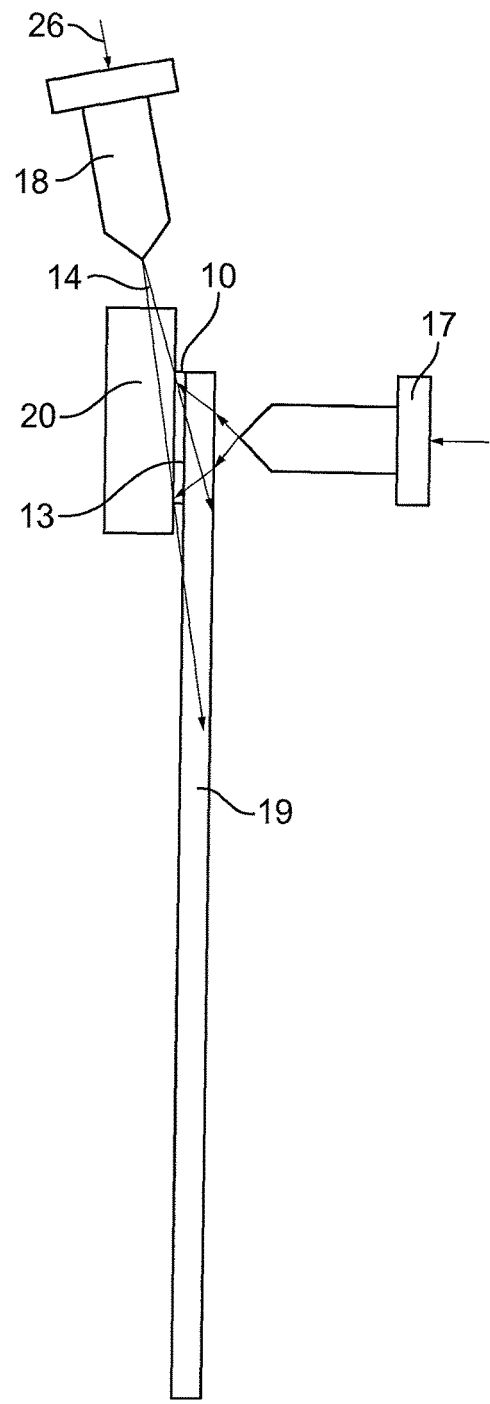
FIG. 1
FIG. 2

SUBSTRATE-GUIDED WAVE-BASED TRANSPARENT HOLOGRAPHIC CENTER HIGH MOUNTED STOP LIGHT AND METHOD OF FABRICATION THEREOF

BACKGROUND OF THE INVENTION

The subject invention related generally to holograms for center-high mounted stop lights (CHMSL) for vehicles, and more particularly to holograms that efficiently meet the required transparency, brightness and angular coverage and to exposure techniques for recording such holograms.

In the United States, Federal regulations require CHMSLs on most motor vehicles in addition to the standard "tail light" stoplights on the rear of the vehicle. CHMSLs are intended to maximize the visibility of the "brake lights" to drivers behind the CHMSL-equipped vehicle, and are usually mounted on or above the rear window of said vehicle.

Pre-CHMSL high-mounted stoplights found in the prior art comprise a standard lenticular lens and an incandescent bulb or light emitting diode (LED) mounted in a housing that is usually secured near the top or bottom of a motor vehicle's rear window. However, such stop light units have bulky housings that partially obscure the rearward vision of the vehicle's driver. Additionally, limitations on the aesthetic and functional design of the automobile are imposed. Some other center high-mounted stoplights found in prior art have been also integrated into automobile body features such as trunks, airfoils, and roofs, which, to a limited degree, substantially reduce or remove the driver's vision problem. However, such high-mounted stoplights are unnecessarily complex and may impose further limitations on the functional and cosmetic design of vehicles.

There were attempts to make transparent CHMSL based on transmission holograms. The illumination lamp was bulky and there was probability that the light beam could be blocked from inside the car. A holographic CHMSL based on a single hologram is known. Such a holographic CHMSL, couples out the light trapped in the substrate by edge lit. This geometry has a well-known disadvantage of significant aberrations and dispersions intrinsic to this type of holographic optical system, and resulted in a non-uniform output beam.

One benefit of the subject invention is high light throughput.

Another benefit of the subject invention is high transmission of implemented holograms that don't create obscuration of the driver's rear view.

Also, flexibility in terms of direction and shaping the beam emitting from the CHMSL is yet another benefit.

Another benefit of the subject invention is low aberration and distortions that allow images to be included in CHMSL.

Another benefit of the subject invention is more uniform light coupled out to the viewer.

Another benefit of the subject invention is flexibility in recording and using either reflection or transmission SGWH.

Still another benefit of the subject invention is adjustability to the different LED, robustness and environmental stability.

SUMMARY OF THE INVENTION

A substrate-guided wave-based transparent holographic CHMSL (SGWHC) with multiple pairs of holograms is disclosed herein. Two holograms are capable of compensating for aberrations in each individual hologram, so the emitted light from the present invention is more uniform, and its beam quality is more predictable.

CONCISE DESCRIPTION OF THE DRAWINGS

These and other benefits of the subject invention, together with additional features contributory thereto and advantages occurring therefrom will be apparent from the following description of several embodiments of the invention when read in conjunction with the accompanying drawings.

FIG. 1 shows beam probation in a substrate with a pair of holograms.

FIG. 2 is a schematic for recording hologram H1.

Figure 5A:
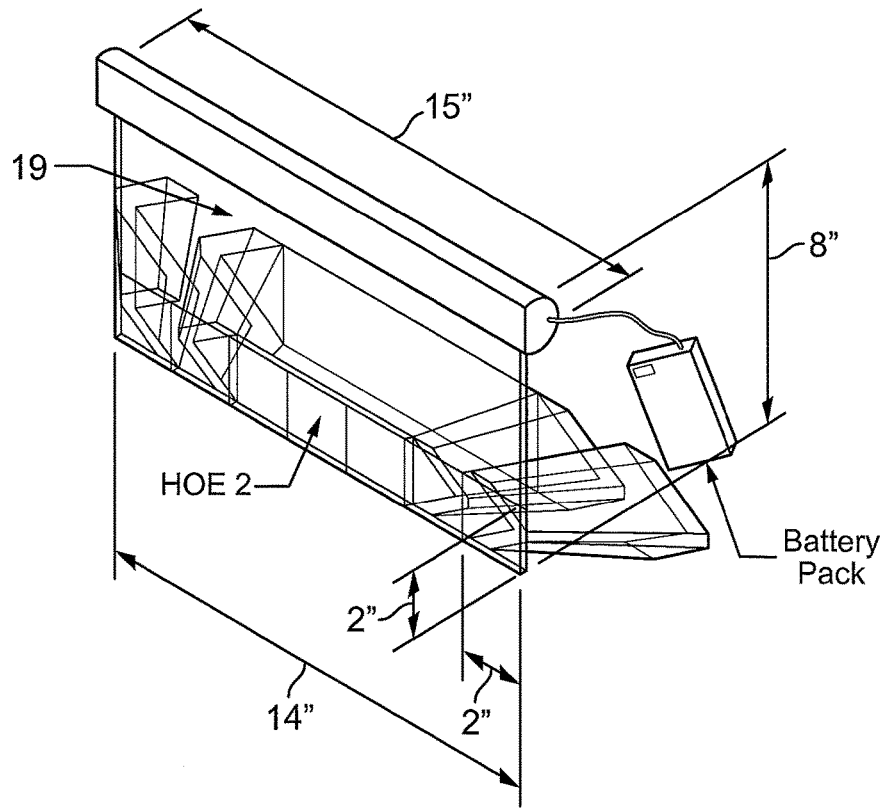

FIGS. 5(a), (b) and (c) show schematics of a substrate-guided wave based stop light.

Figure 6A:
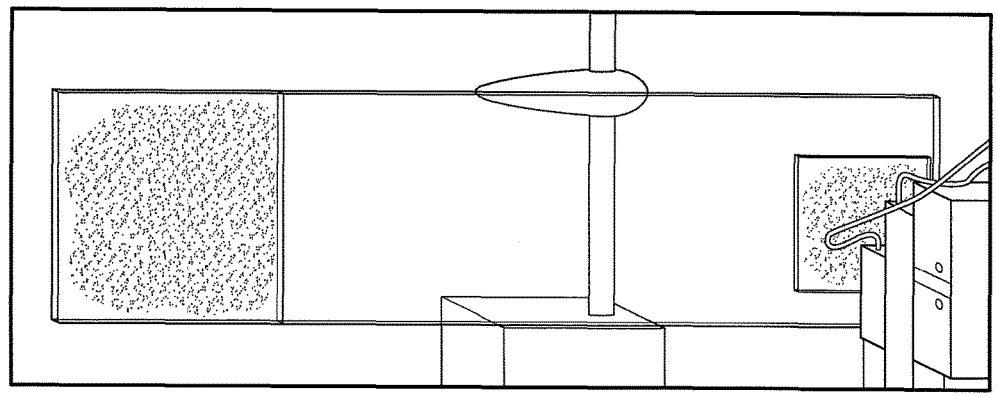

FIG. 6(a) shows a coupled out beam without an image.

Figure 6B:
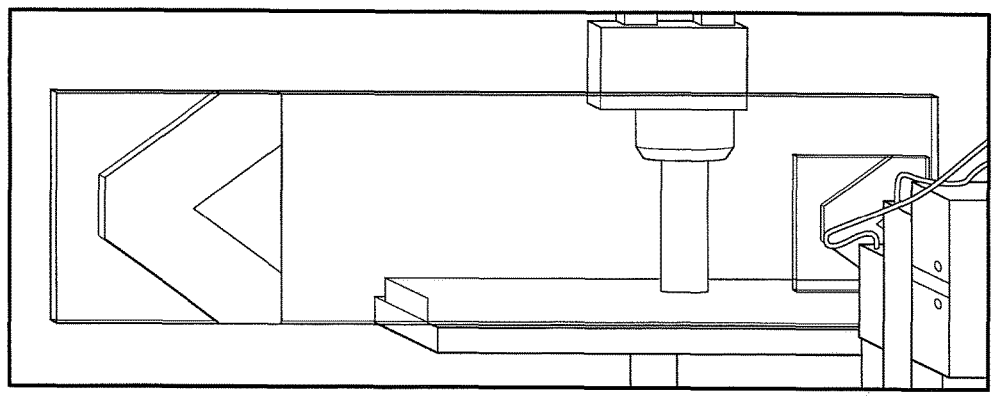

FIG. 6(b) shows a coupled out beam with an image (arrow).

DETAILED DESCRIPTION OF THE INVENTION

FIG. 1 demonstrates the beams propagation in operating one pair of reflection substrate-guided wave-based holograms (SGWHs) 10 and 11. The substrate 19 is acrylic, polycarbonate, glass or any transparent material with the index of refraction close to the hologram index of refraction. A tiny 200 mW red LED 12 with required beam divergency (~120°) and peak wavelength ~635 nm, illuminates reflection substrate-guided wave-based hologram (SGWH) H1 11 with the size ~20 mm×20 mm (¾"×¾") at Bragg conditions to maximize the diffraction efficiency (DE) of the beam coupled due to the diffraction at TIR (total internal reflection) inside the transparent substrate. The substrate 19 can be of any width and length. In the embodiment of FIG. 1, the substrate 19 is ~6 mm thick, 200 mm long and 350 mm wide (¼"×8"×14") and positioned at a distance ~3 mm (⅛") from the PCB (printed circuit board) with at least one LED 12 illuminating hologram H1 10. Coupled beams propagate along the substrate 19 at total internal reflection experiencing multiple bounces from the walls and expanding eventually to the size sufficient to illuminate a 50 mm×50 mm (2"×2") reflection hologram H2 11 that couples the beam out at the required divergency and direction.

Figure 3:
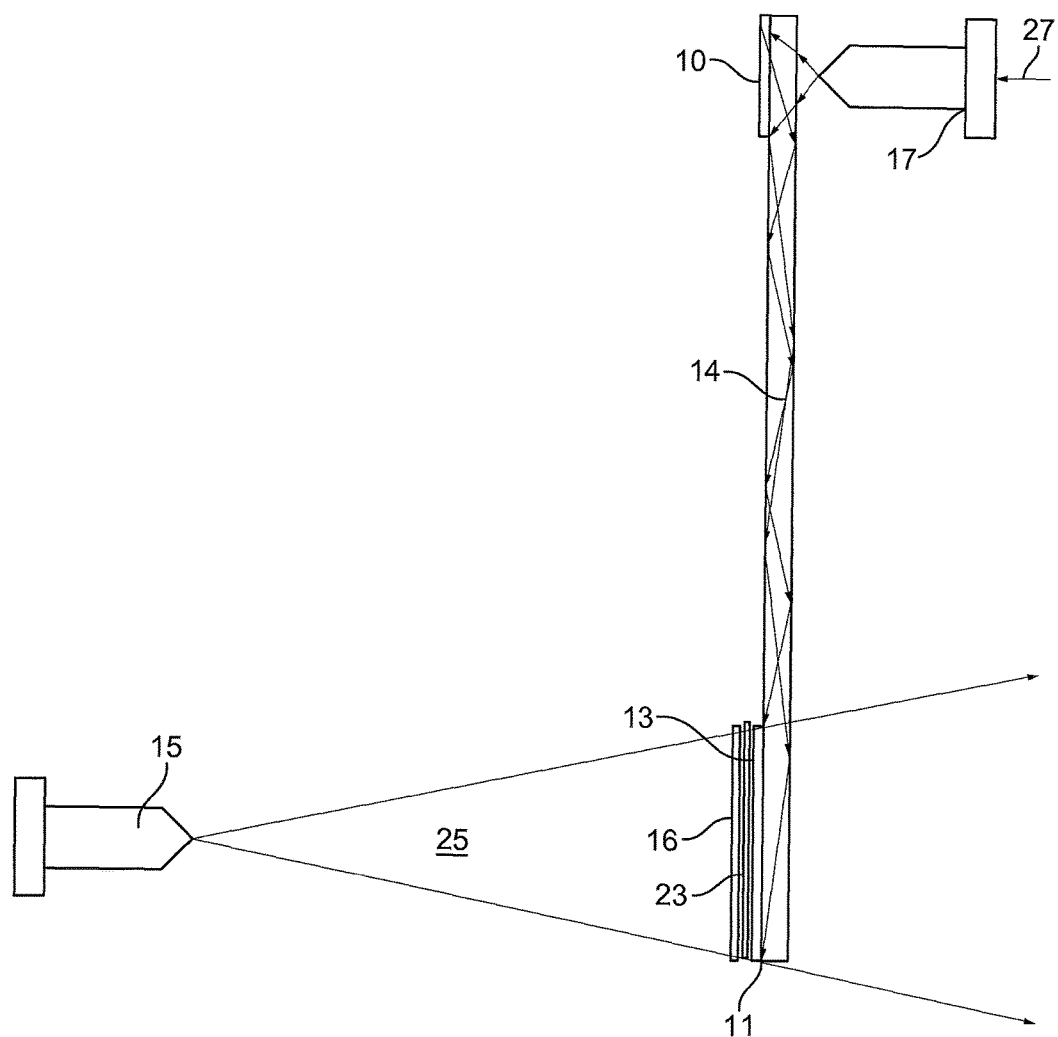
FIG. 3 is a schematic for recording hologram H2 which is retrieved by hologram H1 guided beam as one of the recording beams.

Schematics of setups for recording reflection SGWHs H1 10 and H2 11 are shown in FIGS. 2 and 3.

Figure 5A:
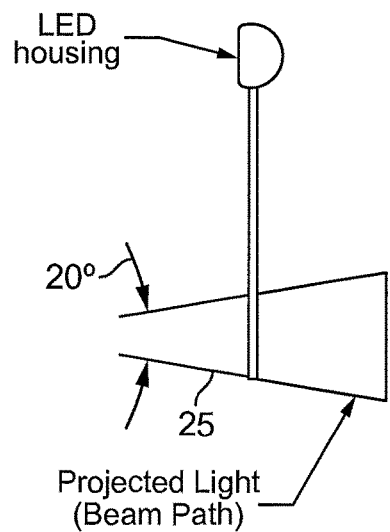
Figure 5A:
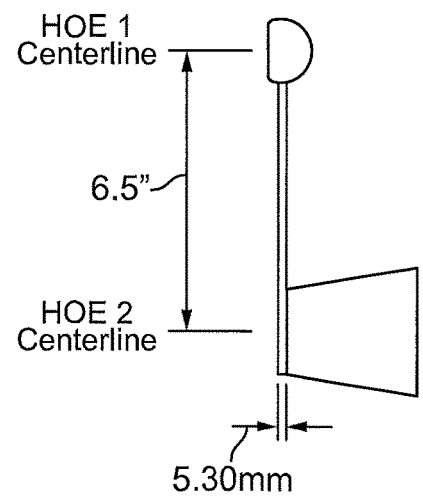

FIG. 2 shows H1 10 being recorded by two beams. Holographic recording thin film material 13 of size ~25 mm×25 mm (1"×1") is laminated to the acrylic substrate 19. One recording beam created by the beam expander 18 is coupled inside the acrylic substrate at total internal reflection using glass block 20. Before this beam is coupled inside the substrate at total internal reflection, it passes through the holographic recording thin film material 13. This thin film material can be a wide variety of materials and can be chosen to support the specific application. A low birefringence polycarbonate or polyester such as polyethylene terephthalate or a polyethylene naphthalate film are materials in common use as substrates for holographic polymers. Examples of holographic materials that can be implemented are holographic polymers manufactured by Bayer (Bayfol®) and DuPont (Melinex®, Teijin®). The divergency of this beam is determined to illuminate the area 50 mm×50 mm (2"×2") at a certain distance (as shown in FIG. 5, this distance is 6.5" or ~165 mm) after experiencing several required internal reflections from the substrate walls. Another recording beam is created by the beam expander 17 with input beam 27 (FIG. 3) and is coming from air normal to the substrate. The divergency of this beam should match the divergency of the LED beam to maximize the beam 26 (FIG. 2) coupling and light throughput.

A guided beam 14 retrieved by the hologram H1 10 by illuminating it with beam expander 17 is used as guided beam for recording on holographic recording thin film material 13 which is 50 mm×50 mm (2"×2") hologram H2 11 that is laminated to the substrate 19 as is shown in FIG. 3. Referring now to the beam expanding—means 15 (FIG. 3), 17 and 18 (FIG. 2) are typically in the form of a microscope objective lens, and a pinhole spatial filter of a few micrometers aperture. The purpose of the beam expanding means 15, 17 and 18 is to expand beams and render them spatially homogenous. Recording beam 25 (FIG. 3) is divergent impinging the holographic recording thin film material from air with the required beam divergency and incident angle to the surface. This beam 25 divergency as well as the incident angle to the surface can be of any required value in the horizontal and vertical directions. In the example on FIG. 5 the beam 25 is shown normal to the substrate surface with divergent angle 20°. To homogenize the divergent beam coupled out by the hologram H2 11 as is shown in FIG. 1, the elliptical light shaping diffuser 23 (FIG. 3) with crossed lenticular lenses 16 are stacked and positioned in the front of the hologram H2 11 as is shown in FIG. 3.

Figure 4:
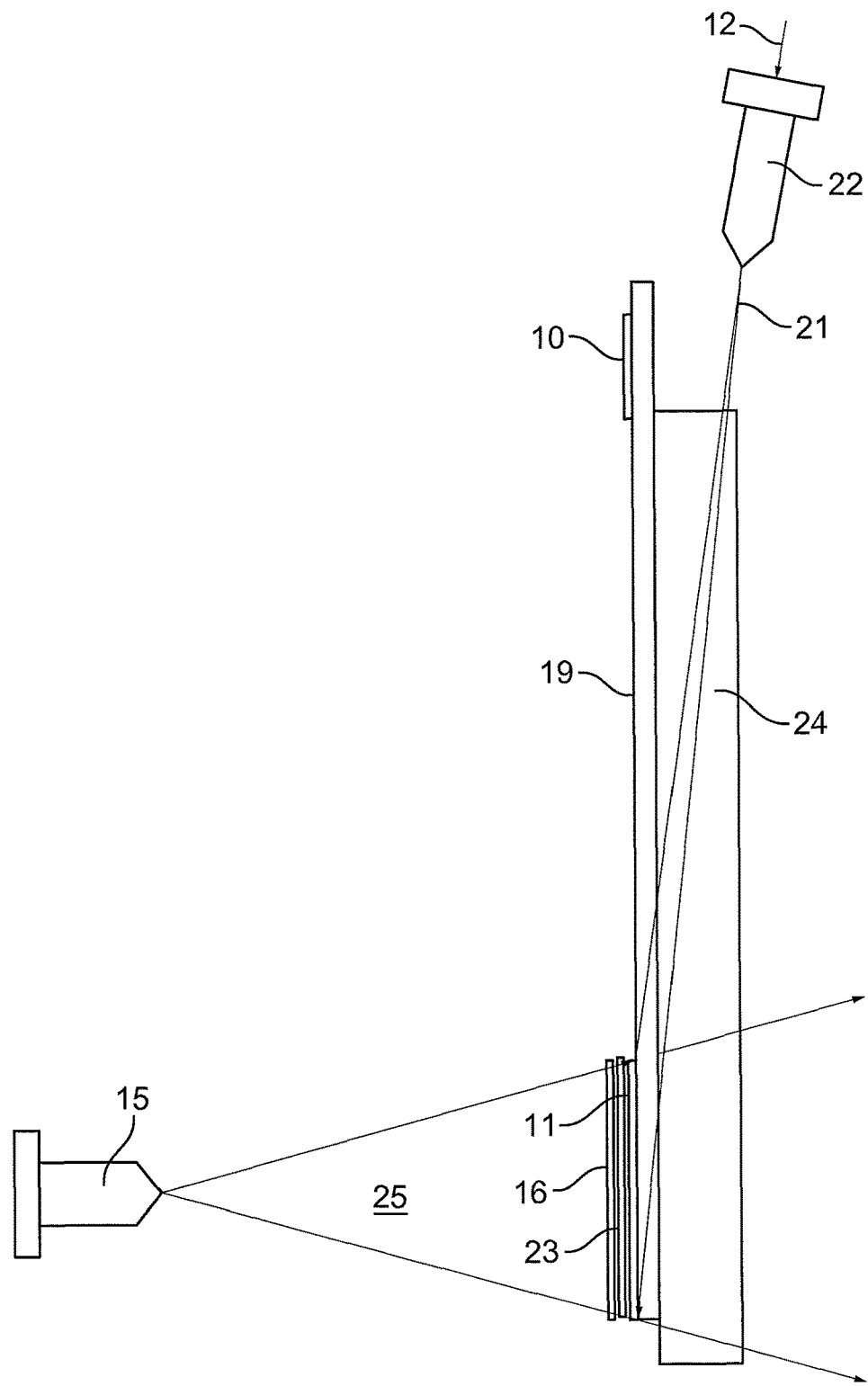
FIG. 4 shows a second embodiment for recording hologram H2.

In another embodiment (FIG. 4), the recording setup for SGWH H2 11 is as shown in FIG. 4. Retrieved by the hologram H1 10, beam 14 used in FIG. 3 as one of recording beams for the hologram H2 11 is replaced by a beam 21 guided using glass block 24 with the same divergency and direction created by the beam expander 22. This recording setup gives more flexibility in terms of laser energy used for recording, doesn't require precise alignment of H1 10 to direct the recording beam to the recording area, and doesn't depend on the quality of the beam retrieved by H1 10 and quality of the substrate material that is not of high optical quality tolerant to the LED 12 light, but sensitive to the coherent laser light.

This design is flexible in terms of the width of the rear-mounted stop lights. In the configuration of FIG. 5, there are several pairs of holograms HOE1 and HOE2 that together create the emitted beam of 50 mm (2 inches) in height and width of 14 inches, thereby creating the possibility of including signs, letters, arrows etc. in the hologram HOE2.

The light throughput is determined by the diffraction equivalency of holograms (theoretically >90%) and efficiency of coupling the LED 12 light in the substrate 19 (theoretically up to 100%). Because the hologram H1 10 can be recorded with any beams, the recording beam angles can be chosen to match the LED 12 beam divergency and wavelength bandwidth to maximize the beam coupling. The central beam wavelength and the bandwidth can be adjusted by recording the hologram at an appropriate angle using existent red lasers (632.8 nm or 647 nm) and choosing the type of hologram (reflection that has narrower bandwidth ~20 nm, or transmission with wider wavelength selectivity >20 nm).

Photos of played back hologram samples having two holograms are shown in FIGS. 6(a) and (b), where FIG. 6(a) shows a coupled out beam without an image, and FIG. 6(b) shows a coupled out beam with an arrow as the image.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A light assembly for a vehicle comprising a substrate guided wave based transparent hologram (SGWH) having:
   a) a first light source transmitting a first light beam in a first direction through a beam expander to illuminate a first substrate guided wave based hologram;
   b) a second light source different from the first light source transmitting a second light beam different from the first light beam and in a second direction different from the first direction through a beam expander to illuminate a holographic recording thin film;
   c) said first light beam diffracted on the first substrate guided wave based hologram and propagating along a substrate by internal reflection;
   d) said holographic recording thin film secured to the substrate whereby the second light beam passes through a crossed lenticular lens and then an elliptical light shaping diffuser to homogenize the second light beams, and then couples with the first diffracted light beam within the substrate and records the second hologram;
   e) wherein the coupled first and second light beams retrieved by the second hologram outputs an image or illuminates an area outside the substrate when said first hologram is illuminated with the light source.

2. The light assembly of claim 1, wherein the substrate is a transparent material with the index of refraction close to the hologram index of refraction.

3. The light of assembly of claim 1, wherein the substrate is a material selected from the group of acrylic, glass and polycarbonate.

4. The light assembly of claim 1, wherein the first light source is an LED.

5. The light assembly of claim 1 wherein the second beam passes through a second thin film after said lenticular lenses and diffuser.

6. The light assembly of claim 1 wherein the first and second thin film comprises a polyester or polycarbonate film with holographic polymer.

7. The light assembly of claim 1 wherein the polyester film is a polyethylene naphthalate film.

* * * * *